US008558594B2

(12) United States Patent
Tang et al.

(10) Patent No.: US 8,558,594 B2
(45) Date of Patent: Oct. 15, 2013

(54) REDUCED FREQUENCY CLOCK DELIVERY WITH LOCAL RECOVERY

(75) Inventors: Bo Tang, Sunnyvale, CA (US); Andrew J. Demas, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/246,290

(22) Filed: Sep. 27, 2011

(65) Prior Publication Data
US 2013/0076422 A1 Mar. 28, 2013

(51) Int. Cl.
*H03K 3/00* (2006.01)
(52) U.S. Cl.
USPC .......................................................... 327/218
(58) Field of Classification Search
USPC .................. 327/199–201, 208–212, 214, 218
See application file for complete search history.

(56) References Cited

U.S. PATENT DOCUMENTS

| 5,799,048 | A  | * | 8/1998  | Farjad-Rad et al. .......... 375/360 |
|-----------|----|---|---------|--------------------------------------|
| 5,911,063 | A  |   | 6/1999  | Allen                                |
| 6,072,348 | A  |   | 6/2000  | New                                  |
| 6,259,283 | B1 |   | 7/2001  | Nguyen                               |
| 6,300,809 | B1 |   | 10/2001 | Gregor                               |
| 7,382,803 | B1 | * | 6/2008  | Cao ................................ 370/503 |
| 7,486,126 | B2 |   | 2/2009  | Shimazaki                            |
| 7,562,316 | B2 |   | 7/2009  | Tschanz                              |
| 7,778,105 | B2 |   | 8/2010  | Golla                                |
| 2006/0103557 | A1 |   | 5/2006 | Padaparambil                         |
| 2009/0249144 | A1 |   | 10/2009 | Whetsel                             |
| 2010/0199137 | A1 |   | 8/2010  | Whetsel                             |
| 2010/0231282 | A1 | * | 9/2010 | Singasani ..................... 327/297 |

OTHER PUBLICATIONS

International Search Report and Written Opinion in application No. PCT/US 12/56456 mailed Nov. 30, 2012.

* cited by examiner

*Primary Examiner* — Lincoln Donovan
*Assistant Examiner* — Sibin Chen
(74) *Attorney, Agent, or Firm* — Lawrence J. Merkel; Eric A. Heter; Meyertons, Hood, Kivlin, Kowert & Goetzel, P.C.

(57) ABSTRACT

Circuits and methods for full rate data reception and transmission using half-frequency clock signals are disclosed. In one embodiment, a flop circuit includes a data input, a data output, and a clock input. The clock signal has a first frequency, while the flop circuit is configured to output data at a rate corresponding to a second frequency. In one embodiment, the second frequency is twice the first frequency. The flop circuit is configured to transmit a first data bit responsive to a first edge (e.g., a rising edge) of the clock signal and a second data bit responsive to a second edge (e.g., a falling edge) of the clock signal that is the next edge following the first edge. Accordingly, the flop circuit may effectively operate at the second frequency utilizing the clock signal at the first lower frequency.

11 Claims, 6 Drawing Sheets

REDUCED FREQUENCY CLOCK DELIVERY WITH LOCAL RECOVERY

BACKGROUND

1. Field of the Invention

This invention relates to integrated circuits, and more particularly, the delivery of clock signals in integrated circuits.

2. Description of the Related Art

Modern integrated circuits (ICs) often times include structures known as clock trees for distribution and delivery of clock signals to synchronous circuits. Since a large number of circuits may utilize clock signals, clock trees can be large in many ICs. Due to the large size of clock trees can be a significant driver of power consumption. In some cases, a clock tree can consume 25% of the total power consumed by an IC.

Since the distribution and delivery of clock signals can be a significant driver in power consumption, various power saving techniques have been employed. One commonly used technique is clock gating. Using the technique of clock gating, a clock signal provided to a block of circuitry may be inhibited when the circuitry is idle. Clock gating may be performed at various levels of a clock tree. Fine-grain clock gating may be performed at the level of the clock consumer circuits themselves (e.g., flop circuits). Coarse clock gating may be performed at a higher level that is closer in the clock tree to the root clock signal.

Another common power saving technique involving clock signals is frequency scaling. In an IC that utilizes frequency scaling, a clock frequency may be increased for a heavier workload and reduced for a lighter workload. For example, in a processor having one or more processor cores, the frequency of a clock signal provided to a given core may be adjusted depending on the processing workload of that core. In some ICs, both clock gating and frequency scaling may be performed to provide even more control over the consumption of power incurred by distribution and delivery of clock signals.

SUMMARY

Circuits and methods for full rate data reception and transmission using half-frequency clock signals are disclosed. In one embodiment, a flop circuit includes a data input, a data output, and a clock input. The clock signal has a first frequency, while the flop circuit is configured to output data at a rate corresponding to a second frequency. In one embodiment, the second frequency is twice the first frequency. The flop circuit is configured to transmit a first data bit responsive to a first edge of the clock signal and a second data bit responsive to a second edge of the clock signal that is the next edge following the first edge. Accordingly, the flop circuit may effectively operate at the second frequency utilizing the clock signal at the first lower frequency. This may reduce clock power consumption while enabling operation at a desired frequency.

In one embodiment, a flop circuit includes a first latch, a second latch, and a multiplexer. The first and second latches each include respective inputs coupled to a data input. The first latch is configured to latch data from the data input responsive to a first edge of the clock signal. The second latch is configured to latch data from the data input responsive to a second edge of the clock signal that is a next edge subsequent to the first edge. The multiplexer includes first and second inputs coupled to outputs of the first and second latches, respectively. The multiplexer also includes a select input coupled to receive the clock signal. The multiplexer is configured to select the second input responsive to the first edge of the clock signal, and further configured to select the first input responsive to the second edge of the clock signal.

An integrated circuit is also disclosed. In one embodiment, the integrated circuit includes a clock generator configured to generate a clock signal and a clock tree configured to distribute the clock signal. The clock tree may distribute the clock signal to a plurality of flop circuit configured to transfer data at the second frequency based on a clock signal of the first frequency. The integrated circuit may also include one or more clock doubler circuits configured to receive the clock signal at the first frequency and generate an output clock signal at the second frequency. The output clock signal from the clock doubler may be provided to one or more circuits of the integrated circuit that operate based on receiving the clock signal at the full frequency rather than at the half frequency at which it is distributed via the clock tree.

BRIEF DESCRIPTION OF THE DRAWINGS

The following detailed description makes reference to the accompanying drawings, which are now briefly described.

Figure 1:
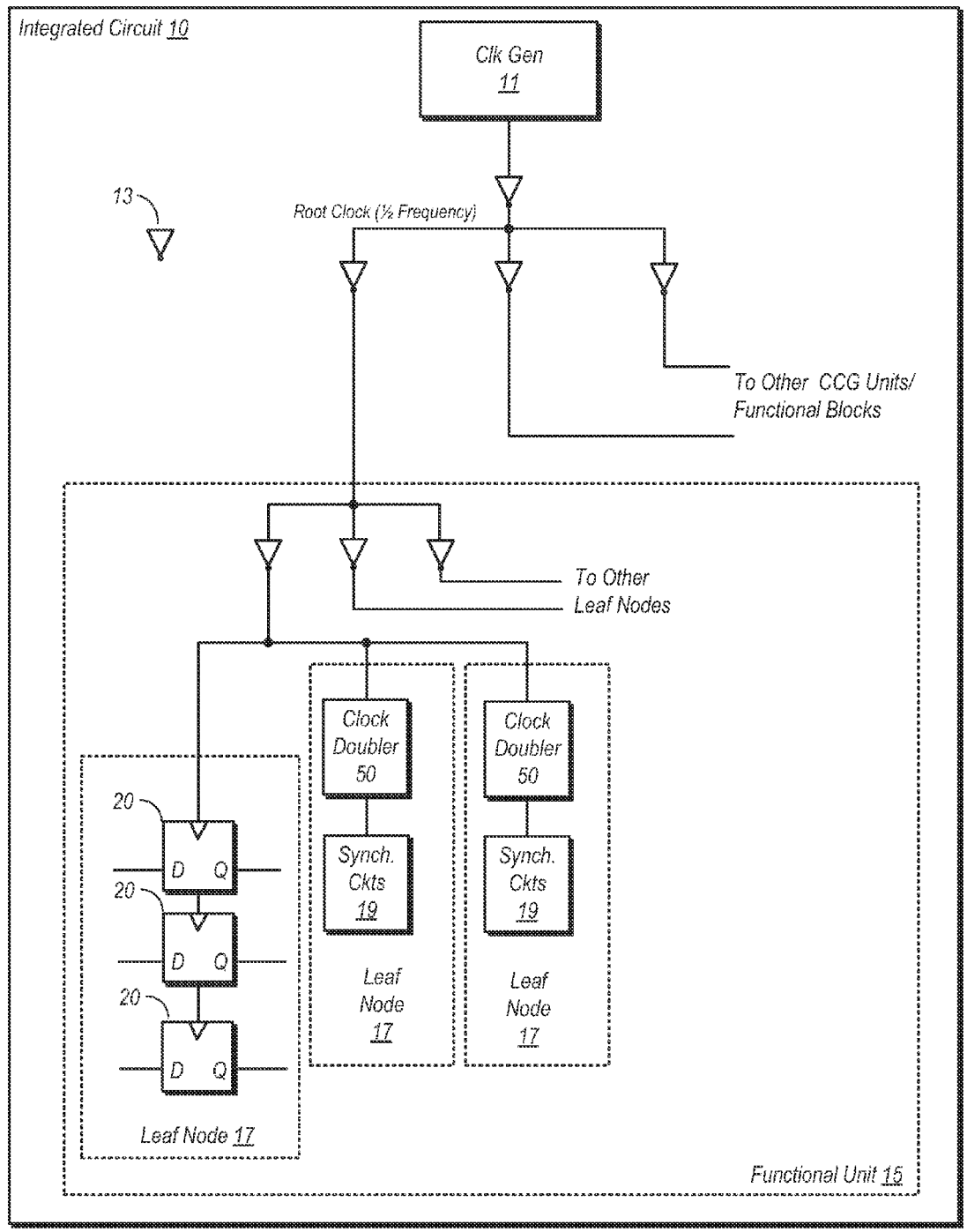
FIG. 1 is a block diagram of one embodiment of an integrated circuit.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION OF EMBODIMENTS

Integrated Circuit:

Turning now to FIG. 1, a block diagram of one embodiment of an integrated circuit (IC) is shown. In the embodiment shown, IC 10 includes a clock generator 11 configured to generate a clock signal. The clock signal output from clock generator 11, the root clock signal, is one half the operating frequency of at least some of the clock consumers within IC 10 (i.e. circuitry which is coupled to receive the root clock signal from clock generator 11). For example, the clock consumers of functional unit 15 in the illustrated embodiment may be rated for operation at 1 GHz, while the root clock signal is provided at 500 MHz.

The root clock signal may be distributed to circuitry within various functional units of IC 10 via a clock tree. The clock tree in this embodiment includes a number of inverters 13 through which the clock signal is provided down to leaf nodes 17 within the various functional units. In the illustrated embodiment, three leaf nodes 17 are illustrated within functional unit 15 (although a greater or lesser number may be present). Each leaf node 17 includes one or more clock consumers.

In one of leaf nodes 17 in the illustrated example, three flop circuits 20 are included. As will be discussed in further detail below, each of these flop circuits may operate at a frequency that is twice frequency of the root clock signal. Thus, in accordance with the example above, each flop circuit 20 may transfer data at a rate corresponding to a clock frequency of 1 GHz using a clock signal of 500 MHz.

In two other leaf nodes 17, synchronous circuits 19 are not configured in the same manner as flop circuits 20. More particularly, synchronous circuits may operate using a clock signal at full frequency. Again using the example above, if the intended rate of data transfer from or within synchronous circuits 19 is 1 GHz, a clock signal having a frequency of 1 GHz may be utilized. In this example, a clock signal of 1 GHz may be provided via a clock doubler 50. As will be explained below, clock doubler 50 may receive a clock signal at a first frequency, and generate a corresponding output clock signal having a second frequency (e.g., 2 times) of the first frequency. Clock doublers 50 may be configured to generate the output clock signal using only logic circuitry, without requiring the additional circuitry of a phase-locked loop (PLL), a delay-locked loop (DLL) or other types of clock generation circuitry.

It is noted that while specific examples of clock frequencies and data rates have been given above, these figures are not intended to be limiting. Accordingly, embodiments are possible and contemplated using a wide variety of data rates and clock frequencies. Furthermore, it is noted that in some embodiments, the clock frequencies and the data rates may vary during operation. More particularly, embodiments are possible and contemplated in which the clock frequency may be reduced to save power and/or increased to allow for higher performance during certain times during operation of a device in which IC 10 is implemented.

Figure 2:
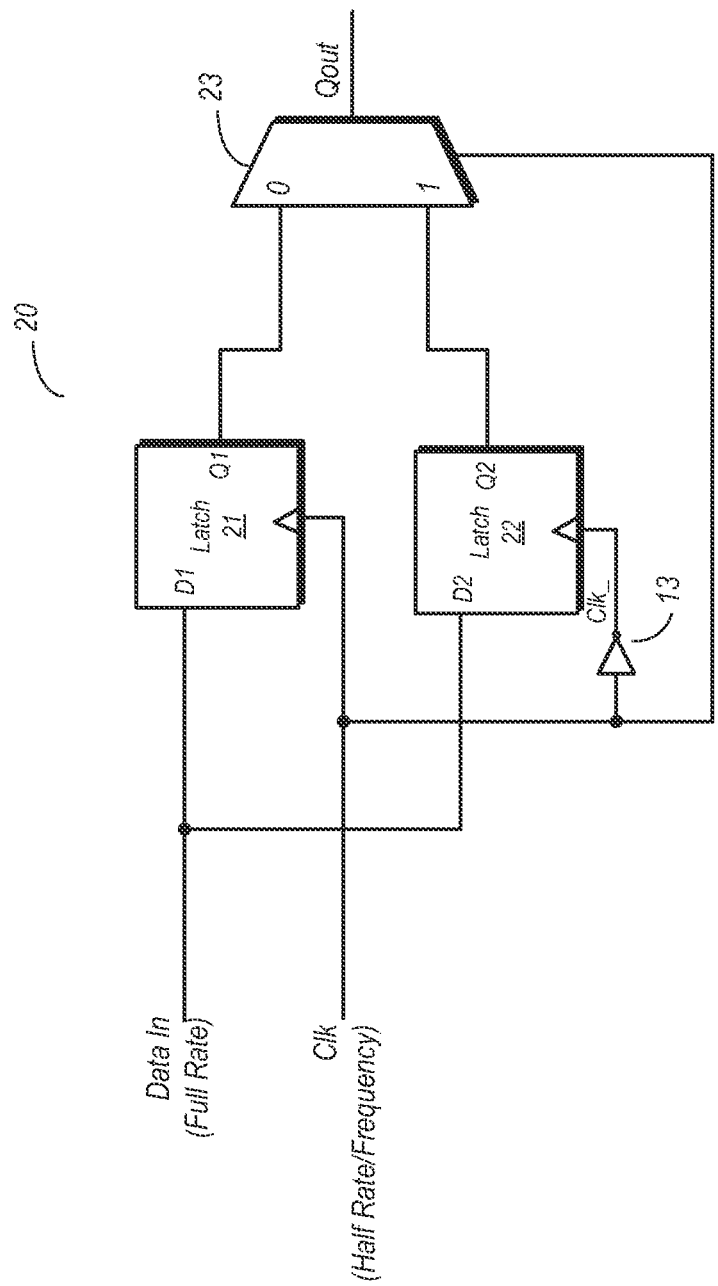
FIG. 2 is a block diagram of one embodiment of a flop circuit configured for full-rate data transfer using a half-rate (half-frequency) clock signal.

Flop Circuit and Operation Thereof:

FIG. 2 is a logic diagram illustrating one embodiment of a flop circuit 20. In the embodiment shown, flop circuit 20 is configured to receive and transmit data at a data rate corresponding to a frequency that is twice that of the received clock signal. Flop circuit 20 includes a first latch 21 and a second latch 22. Latch 21 is coupled to receive the incoming clock signal directly. Latch 22 is coupled to receive a complement of the incoming clock signal ('Clk_') via inverter 13.

Latches 21 and 22 include respective inputs D1 and D2, each of which is coupled to receive incoming data via the data input of flop circuit ('Data In'). Latch 21 in this embodiment is configured to latch data responsive to a rising edge of the clock signal. Latch 22 in the embodiment shown is configured to latch data responsive to a falling edge of the clock signal (which corresponds to the rising edge of the complement of the clock signal).

Flop circuit 20 also includes a multiplexer 23 having a select input coupled to receive the clock signal. A first input of multiplexer 23 is coupled to the output of latch 21 ('Q1'). A second input of multiplexer 23 is coupled to the output of latch 22 ('Q2'). When the clock signal is low, multiplexer 23 in the illustrated embodiment selects the output of latch 21 to be transparent to the multiplexer output ('Qout'). When the clock signal is high, the output of latch 22 is selected to be transparent to the multiplexer output. Thus, in this embodiment, the data latched into the first latch is transmitted from flop circuit responsive to the falling edge of the clock signal. Data latched into the second latch is transmitted responsive to the rising edge of the clock signal.

Generally specking, data received and latched into a particular latch of the illustrated embodiment of flop circuit 20 responsive to an edge of the clock signal is transmitted responsive to the next edge of the clock signal. Thus, bits of data latched responsive to a rising edge are transmitted on the next falling edge, while bits of data latched responsive to a falling edge are transmitted on the next rising edge. Thus, use of a clock signal that is one half the frequency of the data transfer rate may be enabled by the configuration of flop circuit 20. Data may therefore be received by and transmitted from flop circuit 20 at a rate that is twice the frequency of the clock signal. For example, if the clock signal is 500 MHz, data may be received into and transmitted from flop circuit 20 at a rate of 1 GHz.

Figure 3:
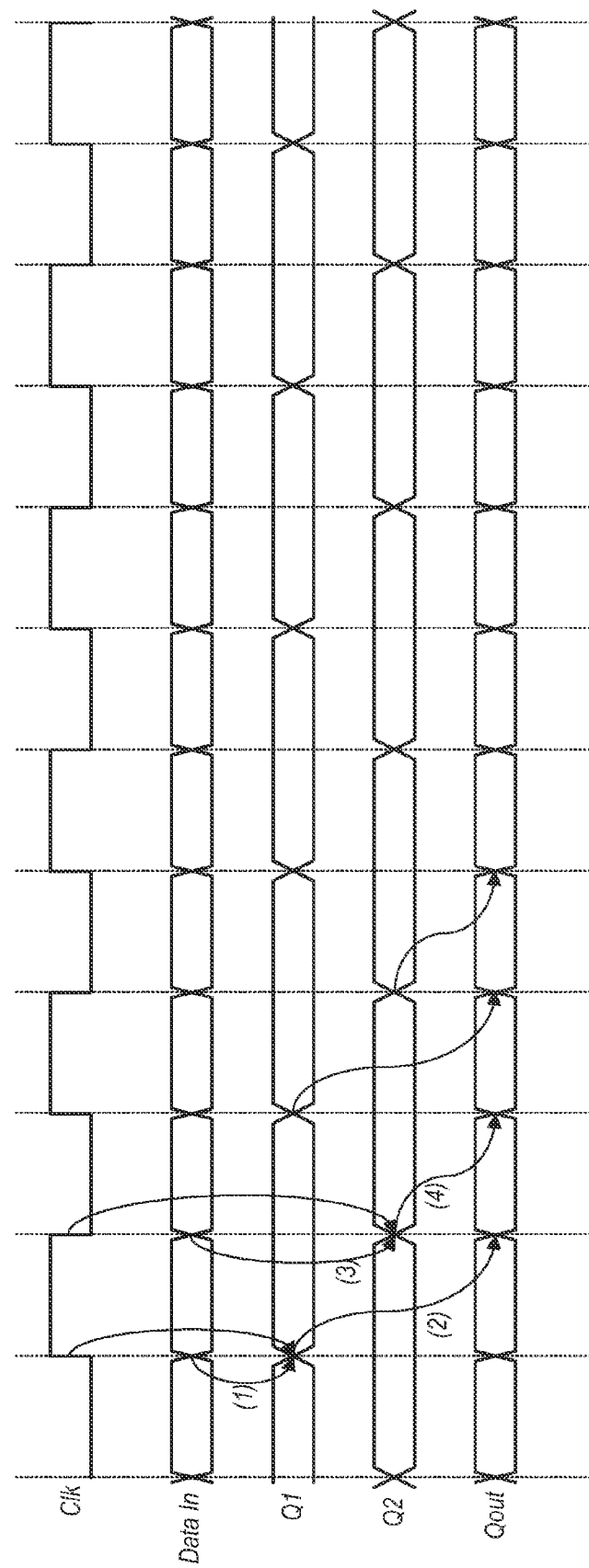
FIG. 3 is a timing diagram illustrating the operation of an embodiment of the flop circuit of FIG. 2.

FIG. 3 is a timing diagram illustrating operation of the embodiment of flop circuit 20 shown in FIG. 2. At (1) in the illustrated example, the clock transitions high and data received on the data input ('Data In') is latched to the output of latch 21 ('Q1'). At (2), on the next falling edge of the clock signal, data from the output of latch 21 is transmitted from the output of multiplexer 23 ('Qout'). At (3), on the falling edge of the clock signal, data from the data input is latched to the output of latch 22 ('Q2'). At (4), on the next rising edge of the clock signal, multiplexer 23 selects the output of latch 22 and transmits the data from its output. Thus, data is latched into flop circuit 20 on each edge of the clock signal. Similarly, data is transmitted from flop circuit 20 on each edge of the clock signal.

Figure 4:
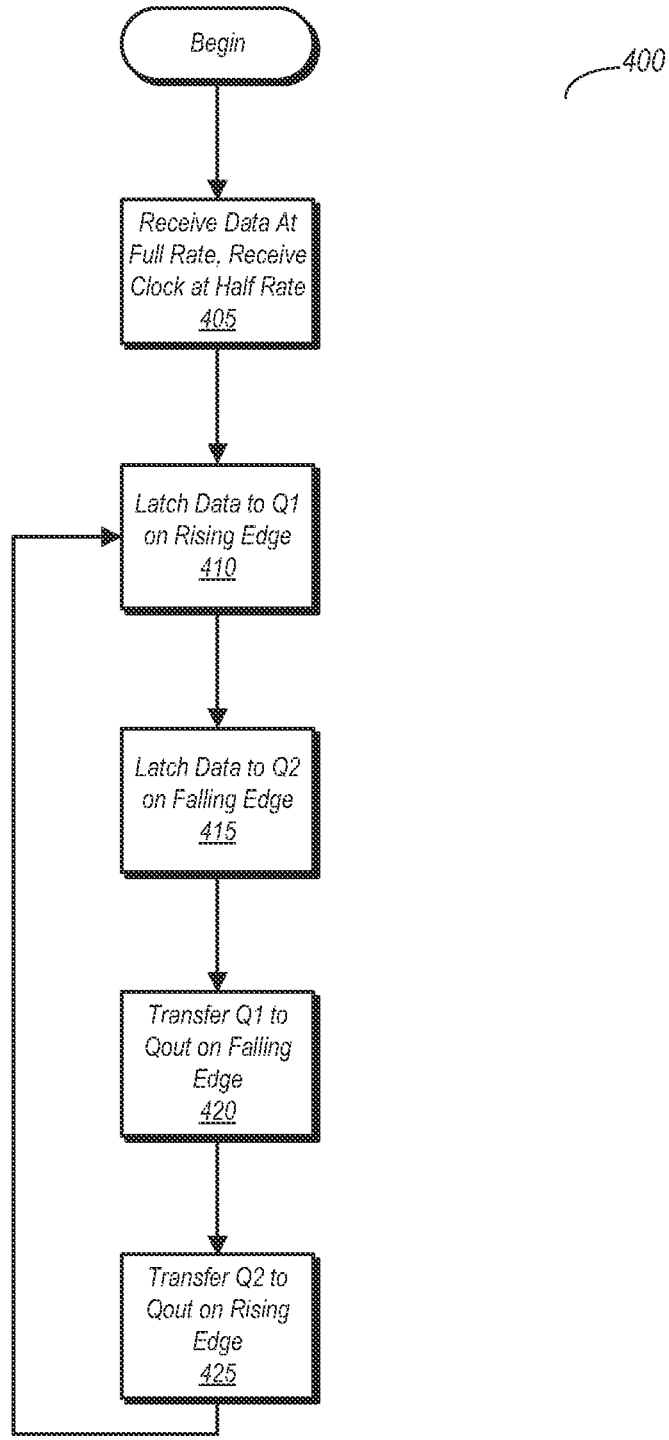
FIG. 4 is a flow diagram of one embodiment of a method for operating a flop circuit with a half-frequency clock signal.

FIG. 4 is a flow diagram illustrating one embodiment of a method for operating a flop circuits such as flop circuit 20 discussed above. Accordingly, method 400 is described in terms of flop circuit 20. It is noted however that method 400 may apply to any flop circuit configured to receive and transmit data on each edge of a clock signal, i.e. at twice the rate of the clock signal frequency.

In the embodiment shown, method 400 begins with a flop circuit receiving data at a full data rate, while receiving a clock signal at a half data rate (block 405). In other words, the frequency of the clock signal may be one half the rate at which data is received by the flop circuit.

On a rising edge of the clock signal, incoming data received on a data input node is latched to an output of a first latch (block 410). On the next falling edge, incoming data received on the data input node is latched to an output of a second latch (block 415). Furthermore, on the same falling edge, a multiplexer may select the output of the first latch to be transferred to the output of the flop circuit (block 420) and transmitted. On the next rising edge of the clock signal, the multiplexer may select the output of the second latch (block 425) to be transmitted. On the same rising edge, the method returns to block 410, as data is again latched into the first latch. The method may repeat itself in this manner during operation of the flop circuit.

Figure 5:
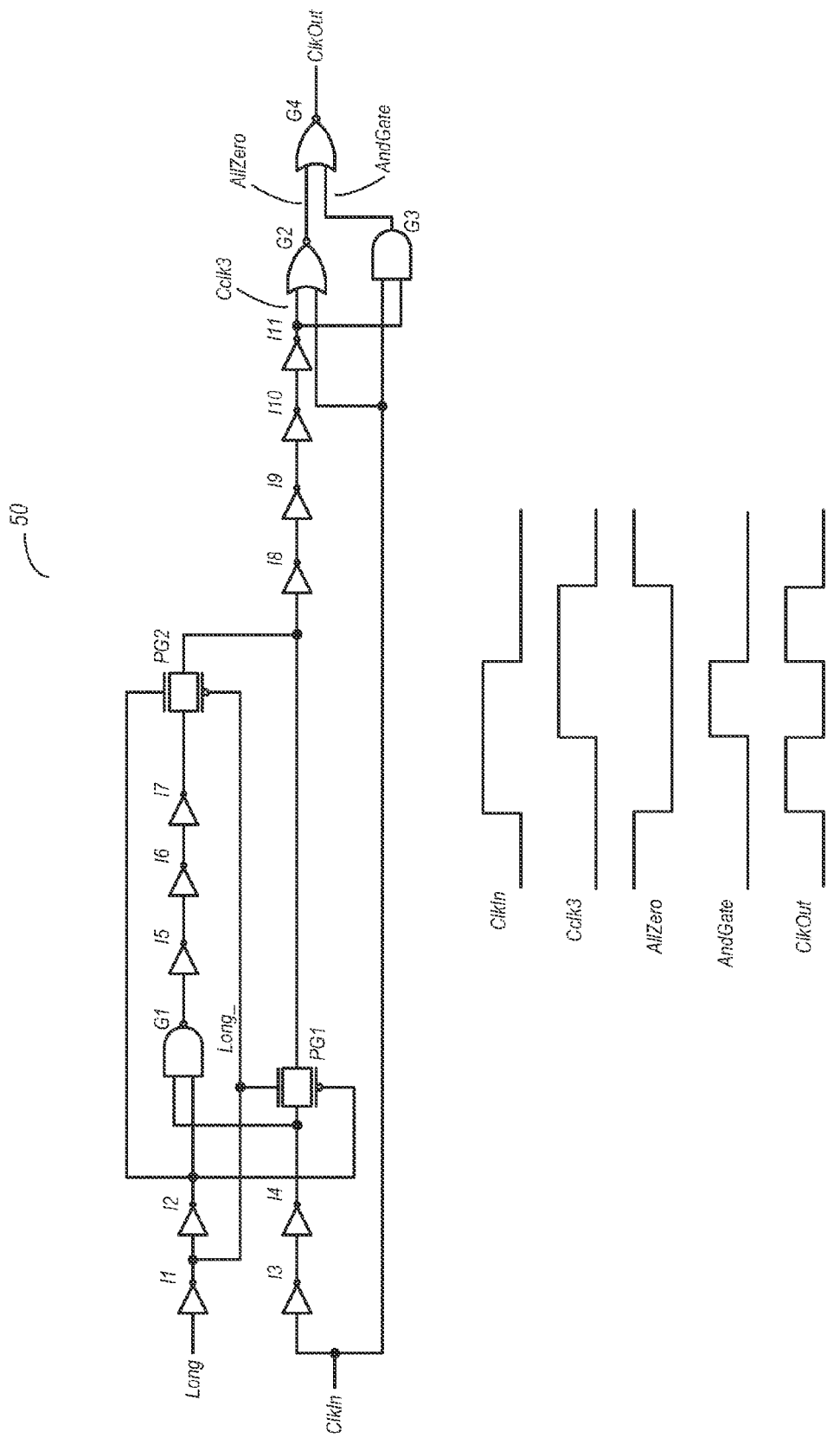
FIG. 5 is a logic diagram of one embodiment of a clock doubler and a timing diagram illustrating its operation.

Clock Doubler Circuit:

Turning now to FIG. 5, a logic diagram illustrating one embodiment of a clock doubler circuit is shown. Clock doubler 50 as shown in FIG. 5 is coupled to receive an input clock signal via the clock input ('ClkIn') and configured to generate and output another clock signal on the clock output ('ClkOut'). The output clock signal may have a frequency that is twice that of the input clock frequency. It is noted that embodiments are possible and contemplated that are configured to produce output clock signals with other multiples of the input clock signal. Clock doubler 50 in the embodiment shown is implemented using only logic circuitry, inverters, and passgates. Accordingly, clock doubler circuit 50 may be implemented in some ICs in lieu of other clock multiplication circuitry that includes phase locked loops (PLLs), oscillators, and so forth.

FIG. 5 includes a timing diagram illustrating the operation of clock doubler 50 (when the 'Long' signal is not asserted). The various internal signal states resulting from the input clock signal cause the output of NOR gate G4 to be driven high responsive to the rising edge of the input clock signal and the falling edge of the input clock signal. The output of NOR gate G4 may fall low approximately halfway between the edges of the input clock signal, thus resulting in an output clock signal having twice the frequency of the input clock signal. Clock doubler 50 may be used to provide a clock signal to circuits within an IC which cannot otherwise be implemented using an embodiment of flop circuit 20 discussed above. Using clock doubler 50 in proximity to such circuits allows the root clock signal to be distributed via the clock tree at one half the required frequency. A local clock doubler 50 may receive the half frequency clock signal and output a full frequency clock signal to the circuit in which it is used. Thus, an IC may be implemented using a combination of the flop circuits 20 and clock doublers 50 in order to provide operation at corresponding to a desired frequency while saving power by distributing the clock signal at one half the frequency.

Clock doubler 50 in the embodiment shown also includes an input ('Long') for increasing the duty cycle of the corresponding output clock signal. Responsive to the assertion of the 'Long' signal, the output clock signal may have a duty cycle that is longer than that produced when the 'Long' signal is not asserted. Thus, the embodiment of clock doubler 50 may be useful in situations in which both a full frequency clock and one with a longer duty cycle are desired. Clock doubler 50 may also be used to tune a duty cycle when reducing frequency. The example the programmability of one embodiment of clock doubler 50 is illustrated. In some embodiments, additional granularity may be provided using additional control signals and corresponding circuitry. It is noted however that embodiments that are not configured for a variable duty cycle are also possible and contemplated.

Figure 6:
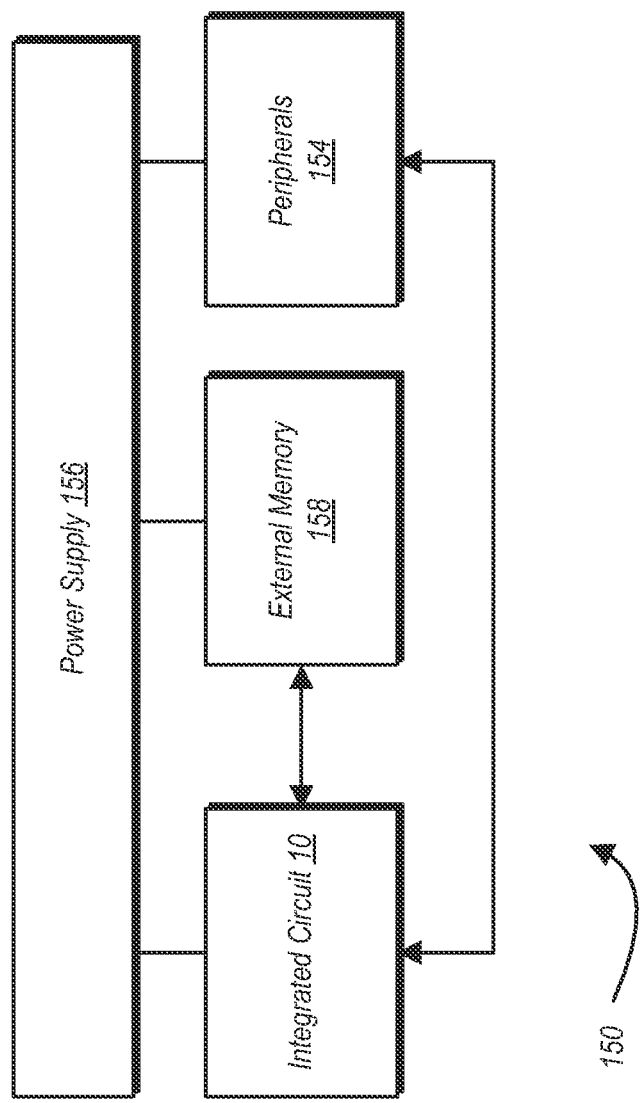
FIG. 6 is a block diagram of one embodiment of a system.

Exemplary System:

Turning next to FIG. 6, a block diagram of one embodiment of a system 150 is shown. In the illustrated embodiment, the system 150 includes at least one instance of an IC 10 (e.g., from FIG. 1) coupled to one or more peripherals 154 and an external memory 158. A power supply 156 is also provided which supplies the supply voltages to the IC 10 as well as one or more supply voltages to the memory 158 and/or the peripherals 154. In some embodiments, more than one instance of the IC 10 may be included (and more than one external memory 158 may be included as well).

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as wifi, Bluetooth, cellular, global positioning system, etc. The peripherals 154 may also include additional storage, including RAM storage, solid-state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, net top etc.).

The external memory 158 may include any type of memory. For example, the external memory 158 may be SRAM, dynamic RAM (DRAM) such as synchronous DRAM (SDRAM), double data rate (DDR, DDR2, DDR3, LPDDR1, LPDDR2, etc.) SDRAM, RAMBUS DRAM, etc. The external memory 158 may include one or more memory modules to which the memory devices are mounted, such as single inline memory modules (SIMMs), dual inline memory modules (DIMMs), etc.

Numerous variations and modifications will become apparent to those skilled in the art once the above disclosure is fully appreciated. It is intended that the following claims be interpreted to embrace all such variations and modifications.

What is claimed is:

1. An integrated circuit comprising:
a clock source configured to generate a clock signal;
a clock tree configured to distribute the clock signal; and
a plurality of functional units, wherein each of the plurality of functional units includes a plurality of leaf nodes each coupled to receive the clock signal from the clock tree, wherein at least one of the leaf nodes includes one or more flop circuits coupled to receive the clock signal from the clock tree, wherein each of the flop circuits includes:
a data input, a data output, and a clock input, wherein the flop circuit is configured to receive, at the data input, data transmitted at a first data rate corresponding to a first clock frequency, and further configured to receive, at the clock input, the clock signal at a second clock frequency that is one half the first clock frequency;
wherein the flop circuit is configured to transmit a first bit of data on the data output responsive to a first edge of the clock signal and is further configured to transmit a second bit of data on the data output responsive to a next edge of the clock signal subsequent to the first edge;
wherein each of the flop circuits includes a first latch coupled to the data input and a second latch coupled to the data input, wherein the first latch is configured to latch data responsive to the first edge of the clock signal and wherein the second latch is configured to latch data responsive to the second edge of the clock signal; and wherein each of the flop circuits further comprises a multiplexer having a first input coupled to an output of the first latch and a second input coupled to an output of the second latch, wherein the multiplexer is configured to select the first input responsive to the second edge of the clock signal and further configured to select the second input responsive to the first edge of the clock signal.

2. The integrated circuit as recited in claim 1, wherein the multiplexer includes a select input coupled to receive the clock signal.

3. The integrated circuit as recited in claim 1, wherein a given one of the flop circuits is configured to latch a first bit on a rising edge of the clock signal and transmit the first bit on the first falling edge of the clock signal subsequent to the rising edge, and wherein the circuit is further configured to latch a second bit on the first falling edge and transmit the second bit on a first rising edge of the clock signal subsequent to the first falling edge.

4. A method comprising:
generating a clock signal, in an integrated circuit;
distributing the clock signal, through a clock tree, to a plurality of leaf nodes in each of a plurality of functional units, wherein said distributing includes providing the clock signal to at least one flop circuit in at least one of the plurality of leaf nodes;
receiving, at the at least one flop circuit, data transmitted at a first frequency and the clock signal transmitted at a second frequency that is one half of the first frequency; and
transmitting, from the at least one flop circuit, a first bit of the data responsive to a first edge of the clock signal and transmitting a second bit of the data responsive to a second edge of the clock signal that is a next edge subsequent to the first edge; wherein the method further comprises:
a first latch of the flop circuit latching the first bit of data responsive to the first edge of the clock signal;
a second latch of the flop circuit latching the second bit of data responsive to the second edge of the clock signal;
a multiplexer selecting an output from the first latch responsive to the second edge of the clock signal; and
the multiplexer selecting an output from the second latch responsive to the first edge of the clock signal.

5. The method as recited in claim 4, wherein the first edge is a rising edge and wherein the second edge is a falling edge.

6. The method as recited in claim 4, further comprising:
providing the clock signal to the first latch;
providing a complement of the clock signal to the second latch; and
providing the clock signal to a select input of the multiplexer.

7. An integrated circuit comprising:
a clock generator configured to generate a clock signal;
a clock tree configured to distribute the clock signal; and
a plurality of functional units each having a plurality of leaf nodes, wherein each of the plurality of leaf nodes is coupled to receive the clock signal from the clock tree, wherein at least one of the plurality of leaf nodes includes a plurality of flop circuits coupled to receive the clock signal from the clock tree, wherein each of the flop circuits includes:
a first latch configured to latch data received on a data input responsive to a first edge of a clock signal;
a second latch configured to latch data received on the data input responsive to a second edge of the clock signal, wherein a transition of the second edge is opposite of a transition of the first edge; and
a multiplexer configured to output data received from the first latch responsive to the second edge of the clock signal and further configured to output data received from the second latch responsive to the first edge of the clock signal.

8. The integrated circuit as recited in claim 7, wherein the flop circuit is configured to receive a first data bit on a first rising of the clock signal and configured to output the first data bit on a next falling edge of the clock signal.

9. The integrated circuit as recited in claim 8, wherein the flop circuit is configured to receive a second data bit on a first falling edge of the clock signal and configured to output the second data bit on the next rising edge of the clock signal.

10. The integrated circuit as recited in claim 7, wherein the first latch and wherein the second latch is coupled to receive a complement of the clock signal.

11. The flop circuit as recited in claim 7, wherein the multiplexer includes a select input coupled to receive the clock signal.

* * * * *